(12) United States Patent
Pellat et al.

(10) Patent No.: US 7,796,964 B2
(45) Date of Patent: Sep. 14, 2010

(54) INTERMEDIATE-FREQUENCY TYPE RADIO SIGNAL RECEIVER

(75) Inventors: Bruno Pellat, La Terrasse (FR); Davy Thevenet, Domene (FR); Eric Andre, Hurtieres (FR); Florent Sibille, Grenoble (FR); Daniel Saias, Paris (FR)

(73) Assignee: STMicroelectronics S.A., Montrouge (FR)

( * ) Notice: Subject to any disclaimer, the term of this patent is extended or adjusted under 35 U.S.C. 154(b) by 604 days.

(21) Appl. No.: 11/734,907

(22) Filed: Apr. 13, 2007

(65) Prior Publication Data

US 2007/0249306 A1 Oct. 25, 2007

(30) Foreign Application Priority Data

Apr. 13, 2006 (FR) .................................. 06 03252

(51) Int. Cl.
H04B 1/26 (2006.01)
(52) U.S. Cl. .................. 455/196.1; 455/208; 455/209; 455/255; 455/258
(58) Field of Classification Search .............. 455/196.1, 455/208, 209, 255, 258, 130, 141, 151.3, 455/210, 213–214, 227, 230, 259–260, 263, 455/310, 315, 318, 337
See application file for complete search history.

(56) References Cited

U.S. PATENT DOCUMENTS

| | | | | |
|---|---|---|---|---|
| 6,760,577 B2 * | 7/2004 | Li | ............................ | 455/323 |
| 6,826,388 B1 * | 11/2004 | Tanaka et al. | ................. | 455/77 |
| 6,895,063 B1 * | 5/2005 | Cowley et al. | .............. | 375/376 |
| 6,931,237 B2 * | 8/2005 | Miya et al. | .................... | 455/75 |
| 6,931,241 B2 * | 8/2005 | Khlat et al. | ................. | 455/137 |
| 6,985,705 B2 * | 1/2006 | Shohara | .................. | 455/164.1 |
| 7,308,240 B2 * | 12/2007 | Kishi | ......................... | 455/255 |
| 7,542,731 B2 * | 6/2009 | Park et al. | ..................... | 455/84 |
| 2003/0134609 A1 * | 7/2003 | Kasperkovitz et al. | ...... | 455/255 |
| 2004/0116096 A1 | 6/2004 | Shen | ......................... | 455/323 |
| 2008/0096508 A1 * | 4/2008 | Luff | ........................... | 455/209 |
| 2008/0280579 A1 * | 11/2008 | Cloutier et al. | ............. | 455/259 |
| 2009/0312056 A1 * | 12/2009 | Drugge et al. | ............. | 455/561 |

FOREIGN PATENT DOCUMENTS

FR 2781948 2/2000
WO 00/11794 3/2000

* cited by examiner

*Primary Examiner*—Pablo N Tran
(74) *Attorney, Agent, or Firm*—Lisa K. Jorgenson; Allen, Dyer, Doppelt, Milbrath & Gilchrist, P.A.

(57) ABSTRACT

A radio signal receiver includes an input for receiving an input signal having an input carrier frequency modulated by a payload signal to be detected. A frequency converter changes the carrier frequency of the input signal and produces an intermediate signal that is an image of the input signal, and has a carrier frequency equal to an intermediate frequency. A filter circuit filters the intermediate signal. A demodulator eliminates a component, with a frequency equal to the intermediate frequency, from the filtered intermediate frequency, and produces the payload signal. The receiver also includes a detection circuit to produce a level signal representative of a level of the payload signal. A control circuit applies a control signal representative of the level signal to a control input of the frequency converter, the filter circuit and the demodulator.

23 Claims, 3 Drawing Sheets

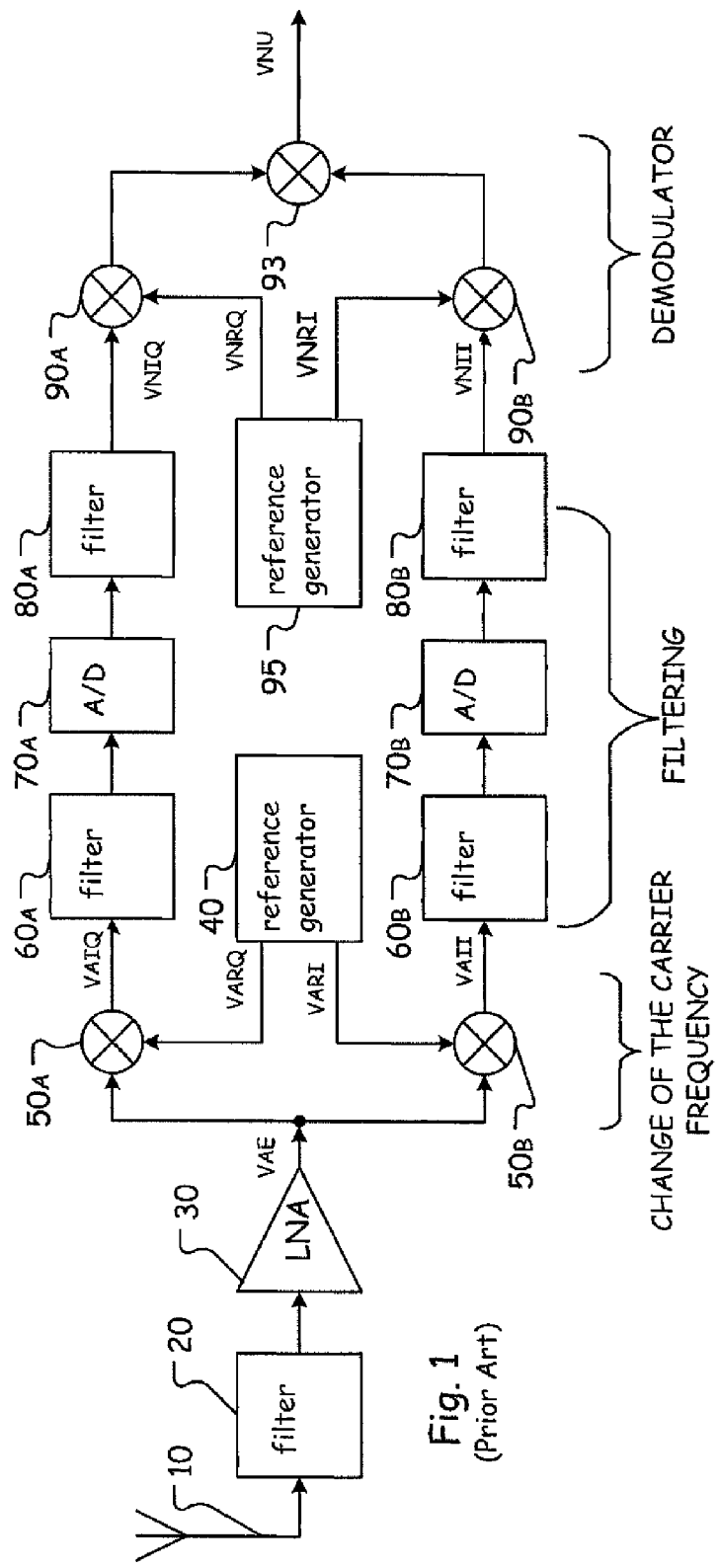
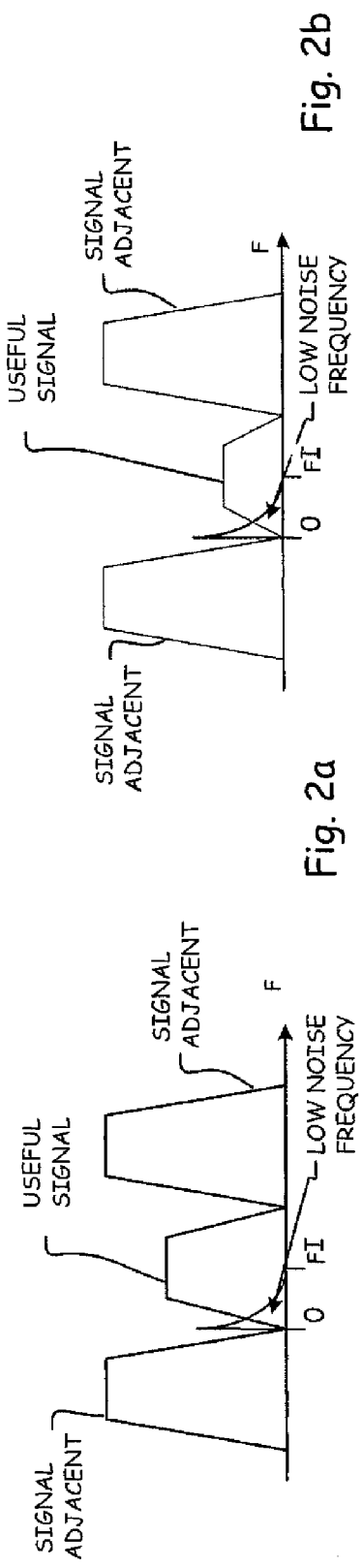
Fig. 1 (Prior Art)
Fig. 2a
Fig. 2b

INTERMEDIATE-FREQUENCY TYPE RADIO SIGNAL RECEIVER

CROSS REFERENCE TO RELATED APPLICATION

This application claims the priority benefit of French patent application number 0603252 filed on Apr. 13, 2006, titled "Intermediate-Frequency Type Radio Signal Receiver", which is hereby incorporated by reference in its entirety.

FIELD OF THE INVENTION

The invention relates to radio signal receivers, and more particularly, to a radio signal receiver made by CMOS technology. These receivers are full analog receivers or part-analog/part-digital receivers for applications such as mobile telephony, for example, of the GSM type.

BACKGROUND OF THE INVENTION

For reasons related essentially to development and manufacturing costs, the present trend is towards the development of CMOS technology wireless receivers, preferably as small as possible. A high level of low-frequency noise in CMOS technology transistors has led to the making of receivers based on an architecture known as low intermediate frequency architecture.

A receiver based on a low intermediate frequency architecture includes means or an input for receiving an input signal that has an input carrier frequency and is modulated by a payload signal, means or a frequency converter for changing the carrier frequency of the input signal and producing an intermediate signal that is an image of the input signal. The carrier frequency of the intermediate signal is equal to an intermediate frequency. Means or a filter circuit filters the intermediate signal, and a demodulator eliminates a frequency component, equal to the intermediate frequency, from the filtered intermediate signal to produce the payload signal.

The input analog signal received at an antenna comprises a carrier frequency signal fe, modulated by a payload signal to be detected whose frequency varies from fmin=fe−δfr to fmax=fe+δfr. In GSM telephony, for example, fe=945 MHz, and δfr=100 kHz. The input signal may also contain one or more undesired adjacent signals having a frequency above fmax or below fmin. If need be, the input signal is filtered and then pre-amplified before processing.

The input signal is then replaced by an intermediate signal having the same shape but with a carrier frequency equal to an intermediate frequency fI generally lower than the initial carrier frequency fe.

The intermediate signal is then filtered to remove especially the low-frequency noise introduced into the signal by the CMOS transistors in the receiver, and the undesired adjacent signals present in the input signal received by the antenna.

Finally, the filtered intermediate signal is demodulated by the elimination of its frequency component equal to the intermediate frequency. Thus, the payload signal is retrieved.

FIG. 1 shows an exemplary embodiment of a CMOS technology intermediate-frequency receiver. In this example, the receiver receives an analog input signal and produces an output digital payload signal. The analog/digital conversion is done simultaneously with the filtering of the intermediate signal. In this example, the change of the carrier frequency, the filtering and then the demodulation is done not directly on the pre-amplified input signal but on two signals in phase quadrature VAEQ, VAEI produced from the input signal.

The receiver of FIG. 1 thus comprises an input circuit (comprising an antenna 10, a filter 20, and a preamplifier 30) to produce an input signal VAE from the received radio signal. A first arm changes the carrier frequency of the signal VAE and produces a signal VAIQ, and filters and then demodulates the signal VAIQ. A second arm changes the carrier frequency of the signal VAE and produces a signal VAII in phase quadrature with the signal VAIQ, and filters and demodulates the signal VAII. A coupler 93 recombines the signals coming from the two arms and produces the payload signal VNU.

The means or the frequency converter for changing the frequency of the input signal comprises the following in the example of FIG. 1. A generator 40 produces two reference signals VARQ, VARI having a frequency f0 and are in phase quadrature. In the first arm, a mixer 50a mixes the input signal VAE and the first reference signal VARQ to produce a modulated intermediate signal VAIQ. In the second arm, a mixer 50b mixes the input signal VAE and the second reference signal VARI to produce a modulated intermediate signal VAII.

The signals VAIQ and VAII have a carrier frequency, called an intermediate frequency, equal to fI=|f0−fe| (absolute value of f0−fe). The generator 40 is classically a phase-locked loop type generator.

In the example of FIG. 1, the means or the filter circuit to filter the intermediate signal also converts the intermediate signal to a digital signal. The filter circuit thus comprises a bandpass analog filter 60a, 60b having a center frequency fc chosen to be equal to the intermediate frequency and having a bandwidth chosen to filter a low-frequency noise and undesired adjacent signals from the intermediate analog signal. The analog filter may be followed by an amplifier (not shown) to match the amplitude of the signals coming out of the filter with the range of operation of the following analog/digital converter.

A converter 70a, 70b converts the filtered analog signal into a corresponding digital signal. A bandpass digital filter 80a, 80b has a center frequency fa chosen such that it is equal to the intermediate frequency to eliminate the undesired adjacent signals from the intermediate digital signal.

Finally, the means or the demodulator for demodulating the filtered intermediate signal comprises the following in the example of FIG. 1. A generator 95 to produce two reference digital signals VNRQ and VNRI having a frequency f0 equal to the intermediate frequency and being in phase quadrature. In the first arm, a mixer 90a mixes the filtered intermediate signal VNIQ and the signal VNRQ, and produces a signal VNUQ. In the second arm, a mixer 90b mixes the intermediate signal VNII and the signal VNRI, and produces a signal VNUI.

After demodulation, the digital signals VNUQ and VNUI produced by each arm in phase quadrature are then recombined by the coupler 93 to produce the final digital payload signal VNU.

The filter 80a, 80b has the function of eliminating the adjacent signals that are still present in the modulated intermediate signal. These adjacent signals are undesired signals, and are present at the same time as the payload signal in the input signal is picked up on the antenna. Their presence is generally defined in the document specifying the communications standards as a function of the value of the power of the payload signal received on the antenna. Thus, for example, in the case of a GSM application, the presence of these adjacent signals is defined for a payload signal power greater than −82 dBs. Finally, the frequency of the adjacent signals is above fmax or below fmin (fmin and fmax defines the range of possible variations of the analog payload signal present in the input signal).

For example, in the case of a GSM application the range of variation of the frequency of the payload signal is contained in a 100 kHz band on either side of the carrier frequency, while the range of variation of the frequency of the adjacent signals is situated in the zone going from 100 kHz to 700 kHz on either side of the carrier frequency.

Since the mixers 50a, 50b are not in perfect phase quadrature, the adjacent signals present at the input signal are superimposed on the payload signal at output of the mixers 50a and 50b, thus creating a parasite signal in the frequency band of the payload signal. This parasite signal has a frequency whose level varies according to the value of the intermediate frequency, and on the precision of the quadrature of the mixers 50a and 50b.

In order that the parasite signal thus generated may be weak enough to achieve the desired reception quality (defined by the communications standard considered, as also in the case of the level of the intermediate signals) it is necessary to select an intermediate frequency that is sufficiently low.

By way of indication, in the case of the GSM standard, the intermediate frequency should be below 200 kHz and, for example, an intermediate frequency of about 100 kHz is chosen.

Furthermore, in a CMOS technology receiver, the CMOS transistors introduce a low-frequency noise whose amplitude is proportional to 1/f, with f being the frequency (FIG. 2a). With the development and miniaturization of CMOS receivers, the low-frequency noise is becoming increasingly significant relative to the level of the radio signals received. This noise has become prohibitive, especially when the received radio signal is at a low or very low level (FIG. 2b). It can no longer be properly filtered out by the filters 60a, 60b of the prior-art receivers unless the manufacturing cost of these filters is greatly reduced.

SUMMARY OF THE INVENTION

In view of the foregoing background, an object of the invention is to provide a receiver that is not sensitive to low-frequency noise. To this end, the receiver may use an intermediate frequency that is variable as a function of the amplitude of the radio signal received at the antenna.

Thus, the radio signal receiver comprises, in the same way as a prior-art receiver, the following. An input for receiving an input signal having an input carrier frequency that is modulated by a payload signal to be detected. A frequency converter for changing the carrier frequency of the input signal, and for producing an intermediate signal that is the image of the input signal, and having a carrier frequency equal to an intermediate frequency. A filter circuit to filter the intermediate signal, and a demodulator to eliminate a component, with a frequency equal to the intermediate frequency, from the filtered intermediate frequency to produce the payload signal.

The receiver according to the invention also comprises a detection circuit to produce a level signal representative of a level of the payload signal, and a control circuit to apply a control signal representative of the level signal to a control input of the carrier frequency converter, the filter circuit and the demodulator. The term "level of a signal" is understood to mean the amplitude of the signal or else its power.

Depending on the control signal, the carrier frequency converter will adjust the value of the intermediate frequency, and the filter circuit and the demodulator will adjust their action according to the value of the intermediate frequency. It is thus possible to choose the following according to the level of the payload signal: a low intermediate frequency or a high intermediate frequency. The low intermediate frequency is chosen if the level of the payload signal is high. It is thus easy to filter the adjacent signals without being hampered by the low-frequency noise having a low level relative to the level of the payload signal. The high intermediate frequency is chosen if the level of the payload signal is low. It is thus easy to filter the low-frequency noise without the quality of reception being disturbed by the presence of the adjacent signals.

For example, the level of the payload signal may be considered to be high or low depending on whether it is above or below the limit for the presence of the adjacent signals as defined by the communications standard considered (at present −82 dBs for the GSM standard).

Depending on the intermediate frequency chosen, the frequency of the filters likely to act on the intermediate frequency signal is then adjusted naturally.

In a preferred embodiment, the frequency converter comprises a reference generator, producing a reference signal, having a reference frequency that is a function of the control signal. A mixer mixes the input signal and the reference signal, and produces the intermediate signal whose intermediate carrier frequency is a function of the reference frequency.

The demodulator comprises a second generator for the production, as a function of the control signal, of a reference digital signal having a reference frequency that is a function of the control signal. A second mixer mixes the modulated digital signal with the reference digital signal, and produces a demodulated digital signal.

In the preferred embodiment again, the filter circuit may also be adapted to converting the intermediate signal into a digital intermediate signal to produce a filtered, demodulated digital signal. The filter circuit may comprise a bandpass analog filter whose center frequency is a function of the control signal, to filter a low-frequency noise from the intermediate analog signal. A converter converts the filtered analog signal to a corresponding digital signal. A bandpass digital filter, whose center frequency is a function of the control signal, eliminates adjacent components from the digital signal.

The detection circuit may comprise, for example, means or a detector to detect a modulation amplitude of the filtered digital signal. In a first embodiment, the control circuit may comprise a comparator to produce the control signal in a first logic state if the level signal is below a predefined threshold or, if not, to produce it in a second logic state. In a second embodiment, the control signal may be the level signal.

BRIEF DESCRIPTION OF THE DRAWINGS

The invention will be understood more clearly and other features and advantages shall appear from the following description of examples of implementation of a radio signal receiver. The description is given by way of indication and in no way restricts the scope of the invention, and is made with reference to the appended drawings of which:

FIG. 1 is a block diagram of a receiver according to the prior art.

FIGS. 2a to 2b are plots showing range variations of certain signals present in the prior-art receiver and/or in a receiver according to the invention.

DETAILED DESCRIPTION OF THE PREFERRED EMBODIMENTS

Figure 3:
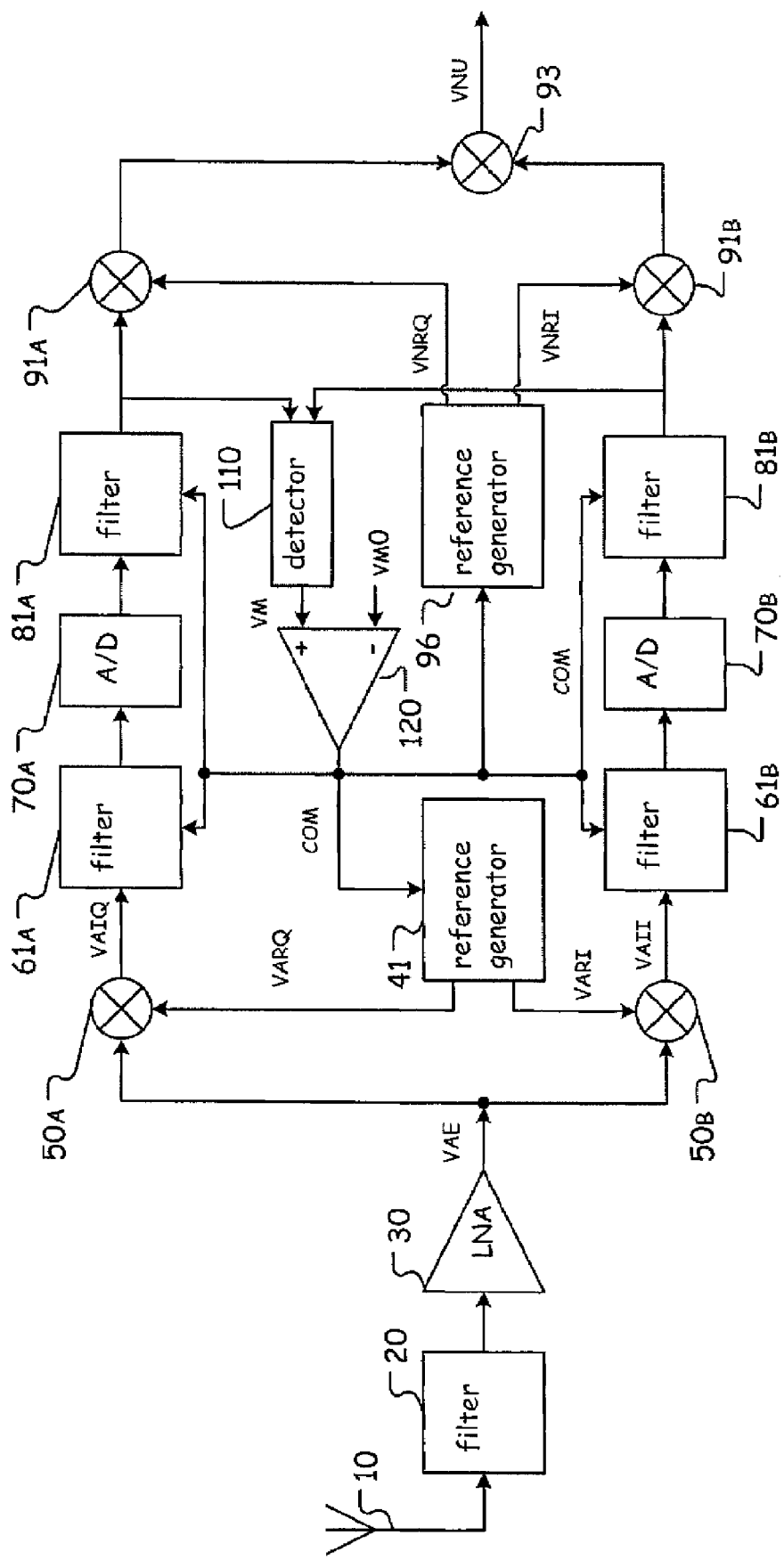
FIG. 3 is a block diagram of a receiver according to a first embodiment of the invention.

FIG. 3 is a block diagram of an example of a receiver according to the invention. The receiver of FIG. 3 can be distinguished from the prior-art receiver shown in FIG. 1 by the following points. A detection circuit 110 and a control circuit 120 are added, the reference generators 40, 95 are replaced by reference generators 41, 96 and the filters 60a, 60b, 80a, 80b are replaced by filters 61a, 61b, 81a, 81b.

The digital examples given in the course of the description are naturally given purely by way of indication, for a GSM type application in which the receiver is used to receive a radio signal having a carrier frequency fe on the order of 945 MHz, and containing a payload signal with a frequency fe equal +/−δfr, with δfr on the order of 100 kHz.

The detection circuit 110 has the function of producing a signal VM representing an amplitude of the input analog signal received at the antenna.

In the example shown, the detection circuit 110 has means to detect a modulation amplitude of the filtered digital signal at the output of the filters 81a, 81b. To this end, the detector measures the value of the amplitude of the signal at output of the filter 81a, and squares the result of the measurement, and measures the value of the amplitude of the signal at output of the filter 81b, and squares the result of the measurement. The detector adds up the result of the two squaring operations. The result of this addition represents the level of the payload signal.

The function of the control circuit 120 is to produce a control signal COM that represents the signal VM, and to apply this control signal to a control input of the reference generators 41, 96 and of the filters 61a, 61b, 81a, 81b.

Compared with the generator 40 (having a fixed frequency f0) that it replaces, the reference generator 41 produces two reference analog signals VARQ and VARII in phase quadrature, whose frequency f0 is variable and is a function of the control signal COM which the generator 40 receives from the control signal 120.

The generator 96 replaces the generator 95 in the same way. The generator 96 produces two reference digital signals VNRQ and VNRI in phase quadrature, having a frequency that is variable and is a function of the control signal COM. The frequency of the signals VNRQ and VNRI is identical to the intermediate frequency fI.

The frequency f0 of the generator 41 determines the intermediate frequency of the receiver: fI=|fe−f0|. Depending on the intermediate frequency (and hence on the frequency f0) chosen, the frequency of the filters are then adjusted.

Thus, as compared with the filters 60a, 60b which they replace, the filters 61a, 61b are bandpass filters whose center frequency fc is variable as a function of the control signal. In practice, fc is equal to the intermediate frequency fI (and is therefore a function of the frequency f0 of the reference generator 41).

In the same way, as compared with the filters 80a, 80b which they replace, the filters 81a, 81b are bandpass filters whose center frequency fa is variable as a function of the control signal. In practice, fa is equal to the intermediate frequency fI (and is therefore a function of the frequency f0 of the reference generator 41).

In a first embodiment shown in FIG. 3, the control circuit is a comparator 120 that receives the signal VM on a positive input from the detection circuit, receives a constant signal VM0 on a negative input, and produces a signal COM which is a first logic state or a second logic state. The signal COM is in a first logic state if the signal VM is higher than VM0 (which corresponds to a payload signal with a level above a threshold level), and is in a second logic state if the signal VM is lower than VM0 (which corresponds to a payload signal with a level below a threshold level).

Generators 41, 96 and filters 61a, 61b, 81a, 81b are then made, and their frequencies are adjusted as a function of the possible values of the control signals. Thus, in this first embodiment, the generator 41 is appropriated for the production of reference signal VAR whose frequency f0 may take two values: f0=f01 if the control signal is in a first logic state, and f0=f02 if the control signal is in a second logic state.

If the first logic state of the control signal corresponds to a payload signal having a level above the threshold level, then f01<f02 is chosen, with f01 fairly low, so that the intermediate frequency fI1=|fe−f01| is low and so that the filtering of the adjacent signals by the filters 81a, 81b is facilitated; and with f02 fairly high, so that the intermediate frequency fI2=|fe−f02| is high and so that the filtering of the low-frequency noise by the filters 61a, 61b is facilitated.

For the chosen digital application, f01 is on the order of 100 kHz and f02 is on the order of 250 kHz. In the first embodiment, the generator 96 has a frequency fI which may take two values fI1 or fI2.

The bandpass filters 61a, 61b for their part have a center frequency fc which may take two values: fc=fI1 when the signal COM is in the first logic state, and fc=fI2 when the control signal is in the second logic state.

It is possible to choose a frequency fc that varies linearly with the intermediate frequency, for example fc1=fI1−a and fc2=fI2−a, with a being a constant.

Finally, the filters 81a, 81b are bandpass filters whose center frequency fa is equal to the intermediate frequency, giving fa=fa1=fI1 when the control signal is in the first logic state, and fa=fa2=fI2 when the control signal is in the second logic state.

Figure 4:
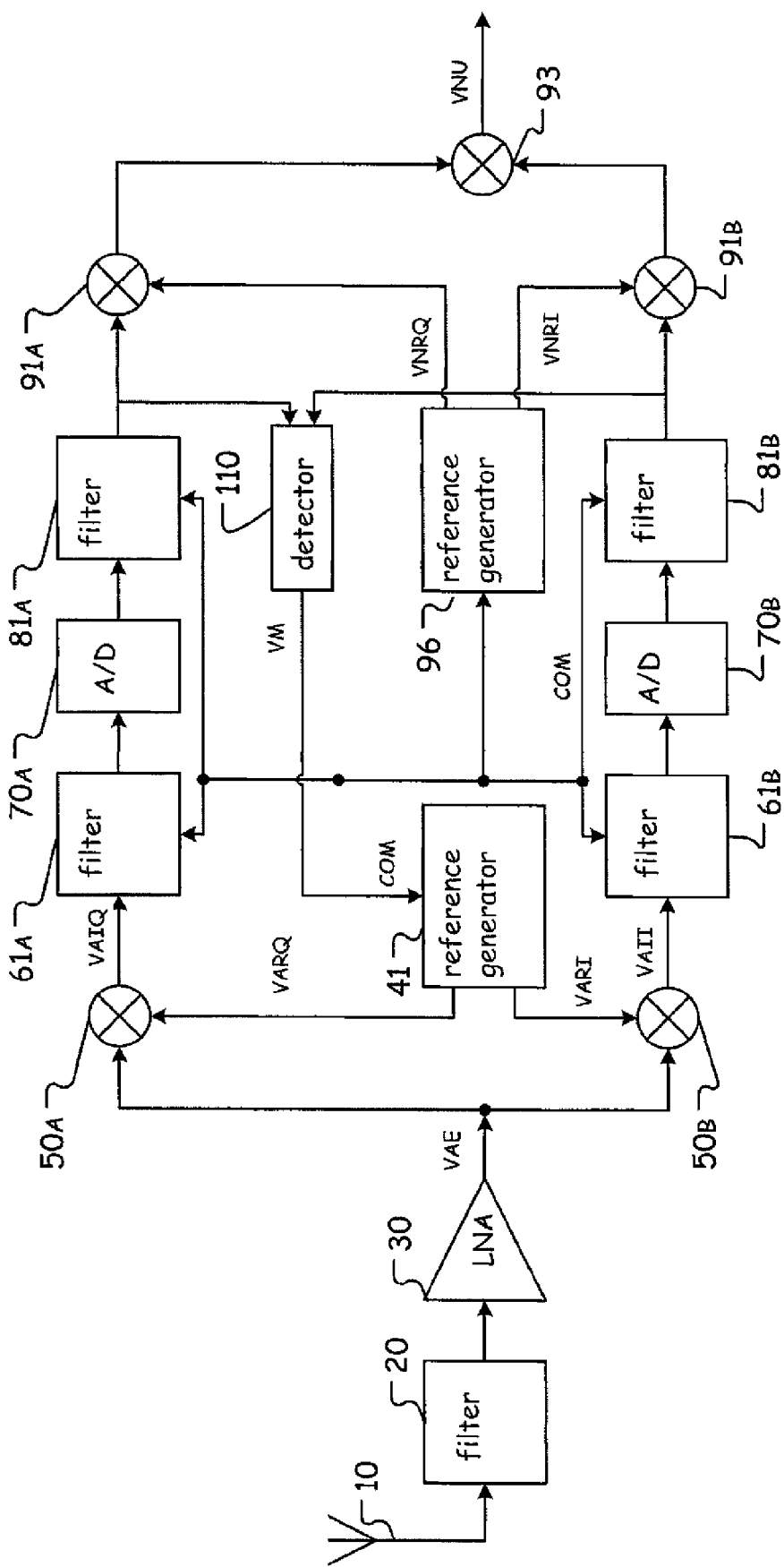
FIG. 4 is a block diagram of a receiver according to a second embodiment of the invention.

In a second embodiment of the invention, which is shown in FIG. 4, the control circuit is a simple wire or, in other words, the control signal is equal to the level signal VM. In this case, therefore, the control signal is likely to vary continuously, as a function of the signal received on the antenna.

As in the first embodiment, the generators 41, 96 and the filters 61a, 61b, 81a, 81b are made so that their characteristic frequencies are adjusted as a function of the possible values of the control signal.

Thus, in this second embodiment, the generator 41 is appropriated to produce a reference analog signal VAR whose frequency f0 may vary continuously when the control signal varies, and more specifically whose frequency f0 increases when the value of the control signal diminishes and vice versa. It is possible, for example, to choose f0 with the form f00*(1+A/|COM|), where f00 and A are constants and |COM| is the value of the control signal COM.

In the same way, the generator 96 is appropriated to produce a reference digital signal VNR whose frequency, equal to the intermediate frequency fI=|fe−f0|, may vary continuously when the control signal varies.

The bandpass filters 61a, 61b for their part have a center frequency fc which varies continuously as a function of the value of the control signal. It is possible to choose a frequency fc which increases when the value of the control signal diminishes (i.e., when the intermediate frequency increases) and vice versa. It is possible for example to choose fc with the form fc0*(1−B*|COM|), where fc0 and B are constants.

Finally, the filters 81*a*, 81*b* are bandpass filters whose center frequency fa is equal to the intermediate frequency, and varies continuously with the value of the control signal.

It must be noted that, in the example described and shown in FIG. 3, the receiver according to the invention receives an analog input signal and produces a digital payload signal at the output, with the analog/digital conversion being done within the filtering through the converters 70*a*, 70*b* inserted between the filters. However, this approach is not limited to receiver of this type, and is also applicable to entirely analog receivers producing an analog payload signal at the output, or else to analog/digital receivers in which the conversion is done further upstream, for example just after the pre-amplification step. Naturally, the filters and reference generators are adapted accordingly. Thus, in an entirely analog receiver, it is preferably a single reference generator and solely analog filters will be used.

Again, in the example of FIGS. 1 and 3, bandpass state filters 60*a*, 60*b*, 61*a*, 61*b*, and bandpass type filters 80*a*, 80*b*, 81*a*, 81*b* were used. Other types of filters may be used, the essential point being that their characteristic frequencies should be adjustable as a function of the value of the intermediate frequency which is variable.

That which is claimed:

1. A radio signal receiver comprising:
    an input for receiving an input signal having a carrier frequency modulated by a payload signal;
    a frequency changer for changing the carrier frequency of the input signal, and generating an intermediate signal having a carrier frequency equal to an intermediate frequency;
    a filter circuit for filtering the intermediate signal;
    a demodulator for removing a component, with a frequency equal to the intermediate frequency, from the filtered intermediate signal for generating the payload signal;
    a detection circuit for generating a level signal representative of a level of the payload signal; and
    a control circuit for applying the level signal as a control signal to said filter circuit, to said demodulator, and to a control input of said frequency changer.

2. The receiver according to claim 1, wherein said frequency changer comprises:
    a reference generator for generating a reference signal having a reference frequency that is a function of the control signal; and
    a mixer for mixing the input signal and the reference signal, and generating the intermediate signal whose carrier frequency is a function of the reference frequency.

3. The receiver according to claim 2, wherein said reference generator increases the reference frequency when a level of the level signal decreases, and decreases the reference frequency when the level of the level signal increases.

4. The receiver according to claim 3, wherein said reference generator modulates the reference frequency according to the equation $f00*(1+A/|COM|)$, where f00 and A are constants and |COM| is an absolute value of the level signal.

5. The receiver according to claim 3, wherein said filter circuit comprises:
    a bandpass analog filter whose center frequency is a function of the control signal for filtering low-frequency noise from the intermediate signal for generating a filtered analog signal;
    a converter for converting the filtered analog signal to a corresponding digital signal; and
    a bandpass digital filter whose center frequency is a function of the control signal for removing adjacent components from the digital signal for generating a demodulated digital signal.

6. The receiver according to claim 1, wherein said filter circuit converts the intermediate signal to a digital intermediate signal and generates a filtered, demodulated digital signal.

7. The receiver according to claim 1, wherein said demodulator comprises:
    a second reference generator for generating, as a function of the control signal, a digital reference signal having a reference frequency that is a function of the control signal; and
    a second mixer for mixing the filtered intermediate signal with the digital reference signal for generating the payload signal.

8. The receiver according to claim 7, wherein said detection circuit comprises a detector for detecting a modulation amplitude of the demodulated digital signal output from said bandpass digital filter.

9. A receiver comprising:
    an input for receiving an input signal having a carrier frequency modulated by a payload signal;
    a frequency changer for changing the carrier frequency of the input signal, and generating an intermediate signal having a carrier frequency equal to an intermediate frequency;
    a filter circuit for filtering the intermediate signal for generating a demodulated digital signal;
    a demodulator for removing a component, with a frequency equal to the intermediate frequency, from the demodulated digital signal for generating the payload signal;
    a detector for detecting a modulation amplitude of the demodulated digital signal from an output of said filter circuit, and for generating a level signal representative of a level of the payload signal; and
    a control circuit for applying the level signal as a control signal to said filter circuit, to said demodulator, and to a control input of said frequency changer.

10. The receiver according to claim 9, wherein said frequency changer comprises:
    a reference generator for generating a reference signal having a reference frequency that is a function of the control signal; and
    a mixer for mixing the input signal and the reference signal, and generating the intermediate signal whose carrier frequency is a function of the reference frequency.

11. The receiver according to claim 10, wherein said reference generator increases the reference frequency when a level of the level signal decreases, and decreases the reference frequency when the level of the level signal increases.

12. The receiver according to claim 11, wherein said reference generator modulates the reference frequency according to the equation $f00*(1+A/|COM|)$, where f00 and A are constants and |COM| is an absolute value of the level signal.

13. The receiver according to claim 11, wherein said filter circuit comprises:
    a bandpass analog filter whose center frequency is a function of the control signal for filtering low-frequency noise from the intermediate signal for generating a filtered analog signal;
    a converter for converting the filtered analog signal to a corresponding digital signal; and a bandpass digital filter whose center frequency is a function of the control signal for removing adjacent components from the digital signal for generating a demodulated digital signal.

14. The receiver according to claim 9, wherein said filter circuit converts the intermediate signal to a digital intermediate signal and generates the demodulated digital signal.

15. The receiver according to claim 9, wherein said demodulator comprises:
   a second reference generator for generating, as a function of the control signal, a digital reference signal having a reference frequency that is a function of the control signal; and
   a second mixer for mixing the modulated digital signal with the digital reference signal for generating the payload signal.

16. A method for operating a radio signal receiver comprising:
   receiving an input signal having a carrier frequency modulated by a payload signal;
   changing the carrier frequency of the input signal using a frequency changer, and generating an intermediate signal having a carrier frequency equal to an intermediate frequency;
   filtering the intermediate signal using a filter circuit;
   removing a component, with a frequency equal to the intermediate frequency, from the filtered intermediate frequency using a demodulator, for generating the payload signal;
   generating a level signal representative of a level of the payload signal; and
   applying the level signal as a control signal to the filter circuit, to the demodulator, and to a control input of the frequency changer.

17. The method according to claim 16, wherein the frequency changer comprises:
   a reference generator for generating a reference signal having a reference frequency that is a function of the control signal; and
   a mixer for mixing the input signal and the reference signal, and generating the intermediate signal whose carrier frequency is a function of the reference frequency.

18. The method according to claim 17, wherein the reference generator increases the reference frequency when a level of the level signal decreases, and decreases the reference frequency when the level of the level signal increases.

19. The method according to claim 18, wherein the reference generator modulates the reference frequency according to the equation f00*(1+A/|COM|), where f00 and A are constants and |COM| is an absolute value of the level signal.

20. The method according to claim 16, wherein the filter circuit converts the intermediate signal to a digital intermediate signal and generates a filtered, demodulated digital signal.

21. The method according to claim 20, wherein the filter circuit comprises:
   a bandpass analog filter whose center frequency is a function of the control signal for filtering low-frequency noise from the intermediate signal for generating a filtered analog signal;
   a converter for converting the filtered analog signal to a corresponding digital signal; and
   a bandpass digital filter whose center frequency is a function of the control signal for removing adjacent components from the digital signal for generating a demodulated digital signal.

22. The method according to claim 16, wherein the demodulator comprises:
   a second reference generator for generating, as a function of the control signal, a digital reference signal having a reference frequency that is a function of the control signal; and
   a second mixer for mixing the filtered intermediate signal with the digital reference signal for generating the payload signal.

23. The method according to claim 22, wherein the detection circuit comprises a detector for detecting a modulation amplitude of the demodulated digital signal output from the bandpass digital filter.

* * * * *